United States Patent [19]

Riu

[11] Patent Number: 5,251,715
[45] Date of Patent: Oct. 12, 1993

[54] AUXILIARY POWER STEERING MECHANISM

[76] Inventor: Wen J. Riu, P.O. Box 82-144, Taipei, Taiwan

[21] Appl. No.: 981,292

[22] Filed: Nov. 25, 1992

[51] Int. Cl.⁵ ............................................... B62D 5/04
[52] U.S. Cl. ..................................... 180/79.1; 180/79
[58] Field of Search ...................... 180/79.1, 79.3, 79, 180/137, 150

[56] References Cited

U.S. PATENT DOCUMENTS

| | | | |
|---|---|---|---|
| 2,727,581 | 12/1955 | Wright | 180/137 X |
| 3,422,949 | 1/1969 | Bankauf et al. | 180/137 X |
| 5,000,278 | 3/1991 | Morishita | 180/79.1 |
| 5,123,496 | 6/1992 | Kashihara et al. | 180/79.1 |

FOREIGN PATENT DOCUMENTS

| | | | |
|---|---|---|---|
| 190678 | 8/1986 | European Pat. Off. | 180/79.1 |
| 11480 | 1/1988 | Japan | 180/79.1 |
| 74164 | 3/1989 | Japan | 180/79.1 |

*Primary Examiner*—David M. Mitchell
*Assistant Examiner*—Gary C. Hoge
*Attorney, Agent, or Firm*—Alfred Lei

[57] ABSTRACT

This invention relates to an auxiliary power steering mechanism and in particular to one including an angle sensor for detecting an angle moved by a steering wheel, a direction controlling processor electrically connected with the angle sensor, a dc motor controlled by the angle sensor and the direction controlling processor, two ratchet wheels each provided with a guard plate at both sides thereof, a plurality of idle wheels, and two cables each connected with a steering arm, a chain connected between the two cables and engaged with the ratchet wheels.

1 Claim, 2 Drawing Sheets

AUXILIARY POWER STEERING MECHANISM

BACKGROUND OF THE INVENTION

It has been found that the prior art power steering mechanisms on the market have the following drawbacks:
1. they are high in cost;
2. they are difficult to maintain;
3. they are too sensitive;
4. the original steering mechanism will be inoperative when the power steering mechanism does not work.

Therefore, it is an object of the present invention to provide an auxiliary power steering mechanism which may obviate and mitigate the above-mentioned drawbacks.

SUMMARY OF THE INVENTION

This invention relates to an auxiliary power steering mechanism.

It is the primary object of the present invention to provide an auxiliary power steering mechanism which is simple in construction.

It is another object of the present invention to provide an auxiliary power steering mechanism which is easy to operate even when the automobile is stopped or the steering wheel is turned slowly.

It is still another object of the present invention to provide an auxiliary power steering mechanism which is is practical in use.

It is still another object of the present invention to provide an auxiliary power steering mechanism which is suitable for use with all kinds of automobiles.

It is a further object of the present invention to provide an auxiliary power steering mechanism which is inexpensive in cost.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
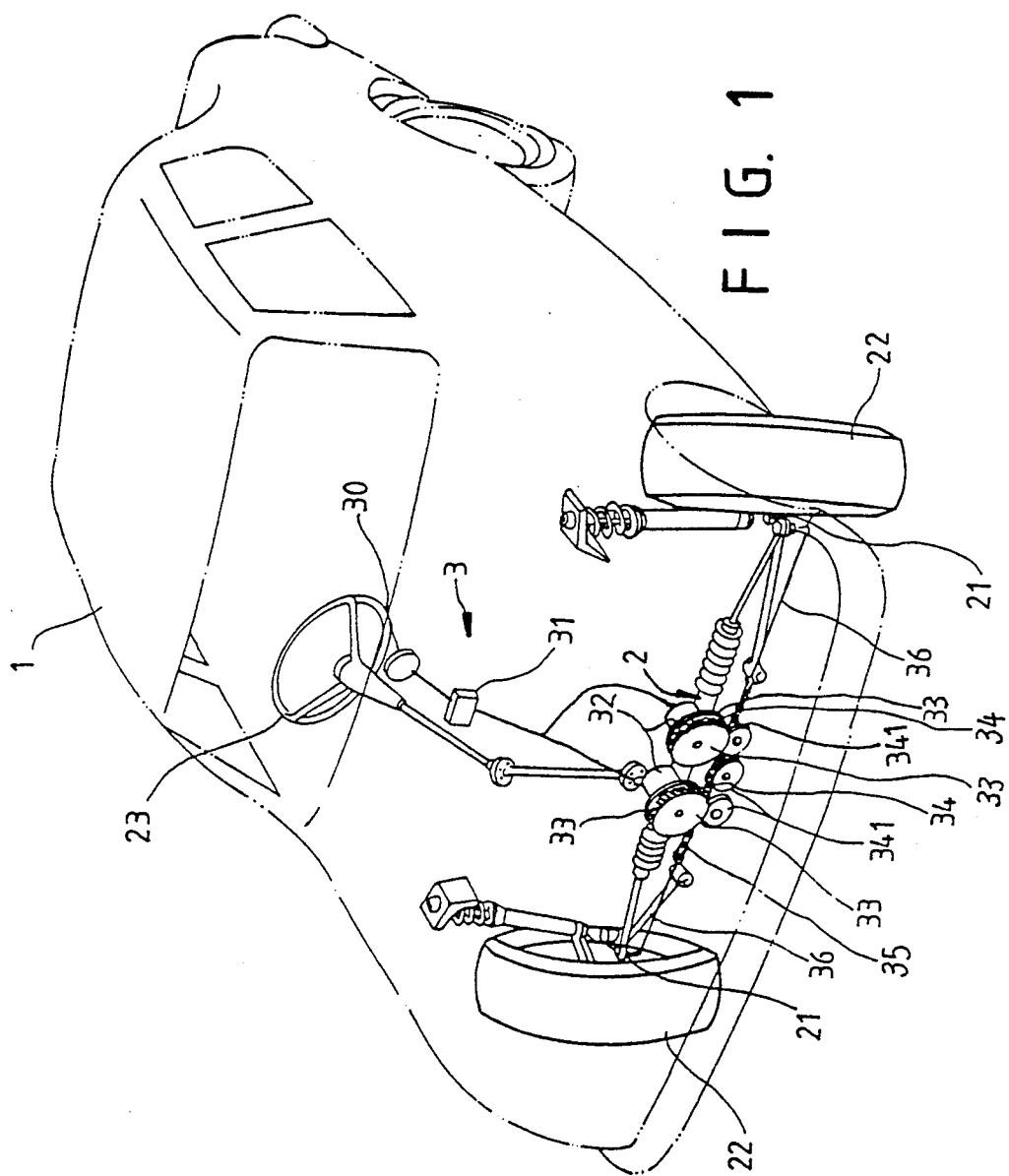
FIG. 1 is a perspective view of a power steering mechanism according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the power steering mechanism 3 according to the present invention mainly comprises an angle sensor 30, a direction controlling processor 31, a dc motor 32, four guard plates 33, two ratchet wheels 34, a plurality of idle wheels 341, a chain 35, and two cables 36. The cable 36 is connected with a steering arm 21. The chain 35 is connected between the two cables 36. The chain 35 is engaged with the ratchet wheel 34 mounted on the front side of the dc motor 32. The guard plates 33 are each mounted on one side of the ratchet 34 so as to prevent the ratchet 34 from disengaging from the chain 35. The idle wheel 341 is designed to prevent the chain 35 from going downward. The dc motor 32 is controlled by the angle sensor 30 located under the steering wheel 23 and the direction controlling processor 31. The angle sensor 30 is electrically connected with the direction controlling processor 31.

Figure 2:
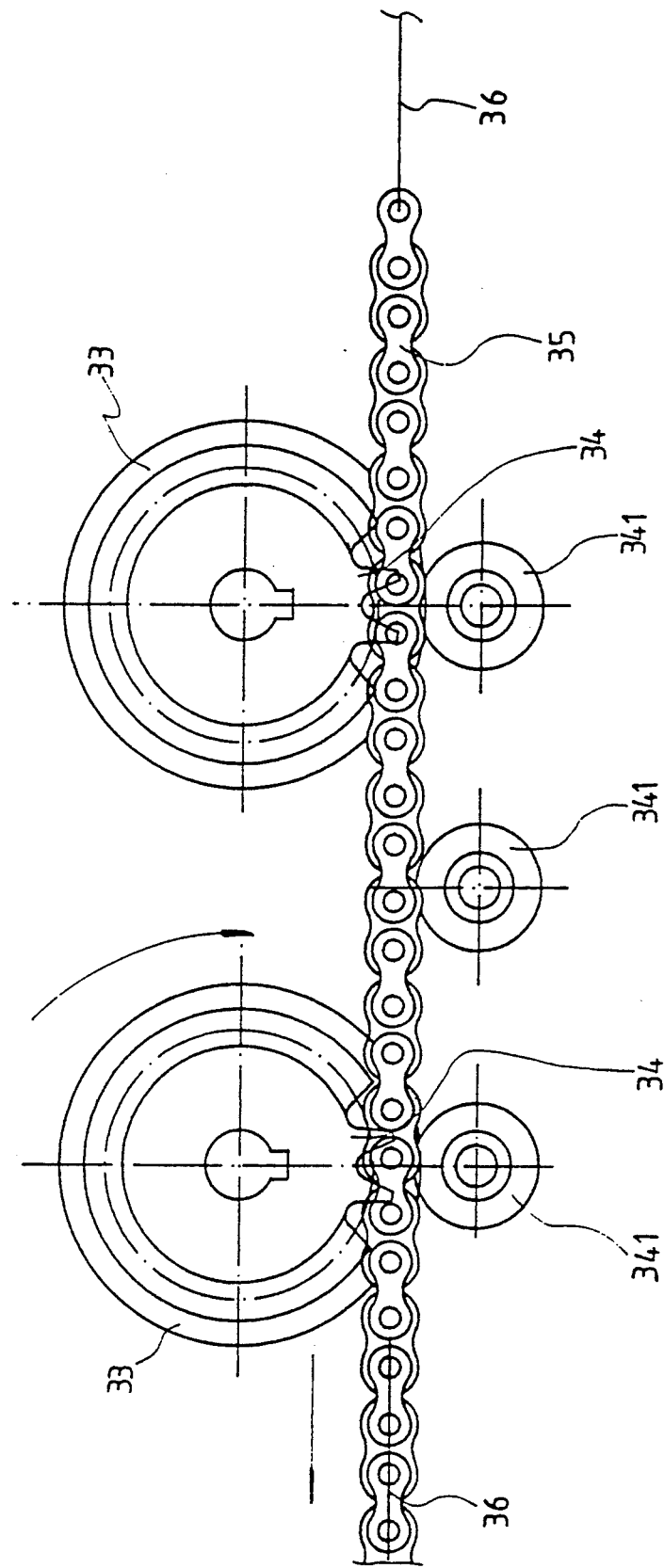
FIG. 2 shows the working principle of the invention.

Looking now at FIG. 2, when the steering wheel 23 is turned through a certain angle, the angle sensor 30 under the steering wheel 23 will be actuated. Then, the direction controlling processor 31 will be driven to control the rotating direction of the dc motor 32. Thereafter, the dc motor 32 will drive the ratchet wheels 34 to rotate. As the ratchet wheel 34 is provided with a guard plate 33 at both sides and a idle wheel 341 thereunder, the ratchet wheel 34 may be steadily engaged with the chain 35. When the ratchet wheel 34 is rotated, the chain 35 will be pulled to move the cables 36 to the left or to the right thereby forcing the steering arms 21 of the steering mechanism 2 to turn the wheels 22 and therefore achieving the purpose of steering.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An auxiliary power steering mechanism for attachment to vehicle steering arms located at each of two steerable wheels, said steering mechanism comprising:
    an angle sensor for detecting an angle moved by a steering wheel;
    a direction controlling processor electrically connected with said angle sensor;
    at least one dc motor controlled by said angle sensor and said direction controlling processor;
    two ratchet wheels driven by said at least one dc motor and each being provided with a guard plate at both sides thereof;
    two cables each connected with a vehicle steering arm;
    a chain connected between said two cables and engaged on one side thereof with said ratchet wheels; and
    a plurality of idle wheels arranged at an opposite side of said chain from said two ratchet wheels for holding said chain against said ratchet wheels.

* * * * *